US009789567B2

(12) United States Patent
Asano et al.

(10) Patent No.: US 9,789,567 B2
(45) Date of Patent: Oct. 17, 2017

(54) LASER BEAM SPOT SHAPE DETECTION METHOD

(71) Applicant: DISCO CORPORATION, Tokyo (JP)

(72) Inventors: Kenji Asano, Tokyo (JP); Keiji Nomaru, Tokyo (JP); Joel Koerwer, Tokyo (JP); Naotoshi Kirihara, Tokyo (JP); Yudai Hata, Tokyo (JP); Yusaku Ito, Tokyo (JP)

(73) Assignee: Disco Corporation, Tokyo (JP)

( * ) Notice: Subject to any disclaimer, the term of this patent is extended or adjusted under 35 U.S.C. 154(b) by 255 days.

(21) Appl. No.: 14/823,589

(22) Filed: Aug. 11, 2015

(65) Prior Publication Data

US 2016/0045980 A1 Feb. 18, 2016

(30) Foreign Application Priority Data

Aug. 18, 2014 (JP) .................................. 2014-166050

(51) Int. Cl.
*B23K 26/073* (2006.01)
*B23K 26/064* (2014.01)
*B23K 26/066* (2014.01)
*B23K 26/067* (2006.01)
*B23K 26/03* (2006.01)
*B23K 26/08* (2014.01)
*B23K 26/70* (2014.01)

(52) U.S. Cl.
CPC .................................. *B23K 26/705* (2015.10)

(58) Field of Classification Search
CPC .............. B23K 26/073; B23K 26/0643; B23K 26/0665; B23K 26/067; B23K 26/032; B23K 26/0869

USPC ............. 219/121.61–121.75, 121.83, 121.85
See application file for complete search history.

(56) References Cited

U.S. PATENT DOCUMENTS

| 5,951,891 A * | 9/1999 | Barenboim | ........ B23K 26/0084 |
| | | | 219/121.68 |
| 2009/0266802 A1* | 10/2009 | Sawabe | ................ B23K 26/046 |
| | | | 219/121.67 |
| 2011/0140007 A1* | 6/2011 | Ogino | ................ B23K 26/0732 |
| | | | 250/492.22 |

FOREIGN PATENT DOCUMENTS

| JP | 2006-12902 | 1/2006 |
| JP | 2006-294674 | 10/2006 |
| JP | 2013-22634 | 2/2013 |

* cited by examiner

*Primary Examiner* — Samuel M Heinrich
(74) *Attorney, Agent, or Firm* — Greer Burns & Crain, Ltd.

(57) ABSTRACT

Disclosed herein is a laser beam spot shape detection method for detecting a spot shape of a laser beam oscillated by laser beam oscillator and collected by a condenser in a laser machining apparatus, the laser beam spot shape detection method including: a concave mirror holding step of holding a concave mirror having a spherical face forming a reflecting face with a chuck table; a focal point positioning step of positioning the focal point of the condenser in a proximity including the center of the spherical face forming the reflecting face of the concave mirror held by the chuck table; a laser beam irradiation step of irradiating a laser beam onto the held concave mirror, and an imaging step of capturing images of reflected light with a camera.

2 Claims, 6 Drawing Sheets

LASER BEAM SPOT SHAPE DETECTION METHOD

BACKGROUND OF THE INVENTION

Field of the Invention

The present invention relates to a laser beam spot shape detection method for inspecting a spot shape of a laser beam oscillated from laser beam oscillation means of a laser machining apparatus and collected by a condenser.

Description of the Related Art

In a semiconductor device manufacturing process, the surface of an approximately disk-shaped semiconductor wafer is partitioned into a plurality of areas by scheduled division lines that are formed in a grid pattern, with a device such as IC or LSI formed in each of the partitioned areas. A semiconductor wafer formed as described above is cut along scheduled division lines, thus dividing the wafer into areas, each having a device formed therein and manufacturing individual device chips. An optical device wafer having a gallium nitride based compound semiconductor or the like stacked on the surface of a sapphire or silicon carbide substrate is similarly cut along scheduled division lines, thus dividing the wafer into individual optical device chips such as light emitting diodes and laser diodes for application to a wide range of electronic equipment.

In order to divide a wafer along scheduled division lines as described above, a method has been proposed which forms laser-machined grooves, break start points, by irradiating a pulsed laser beam at a wavelength that is absorbed by the wafer along scheduled division lines, applies an external force along the scheduled division lines where the laser-machined grooves as the break start points are formed, and thereby cuts the wafer (refer, for example, to Japanese Patent Laid-Open No. 2006-294674).

Further, other attempts are also being made to divide a wafer along scheduled division lines as described above. Such attempts include a laser machining method that uses a pulsed laser beam at a wavelength that passes through the wafer and irradiates the laser beam with the focal point thereof positioned inside the area of interest. This division method using a laser machining approach is designed to continuously form modified layers inside a wafer along scheduled division lines by irradiating the scheduled division lines with a pulsed laser beam at a wavelength that passes through the wafer from one side of the wafer with the focal point thereof positioned inside the wafer and break and divide the wafer by applying an external force along streets whose strength has declined as a result of formation of the modified layers (refer, for example, to Japanese Patent Laid-Open No. 2006-12902).

However, the condenser adapted to collect a laser beam includes a combination lens made up of a number of convex and concave lenses. Besides, there is a distortion in the optical system from the laser oscillator to the condenser. As a result, a laser beam is not always focused into an intended shape such as circular. If there is a distortion in the shape of a focused laser beam, machining cannot be conducted in a desired manner.

In order to solve such a problem, a spot shape detection method is disclosed in Japanese Patent Laid-Open No. 2013-22634. This method detects a spot shape by holding a detection substrate having a light emitter made of extremely small particles with chuck table, moving the chuck table in the X- and Y-axis directions while at the same time irradiating the light emitter with a laser beam, and detecting the spot shape from the coordinates of reflected light from the light emitter.

SUMMARY OF THE INVENTION

However, it is difficult for a condenser having a large numerical aperture (NA) such as 0.4 to 0.9 to capture reflected light from the light emitter, thus rendering it impossible to detect a spot shape.

In light of the foregoing, it is an object of the present invention to provide a laser beam spot shape detection method that allows for accurate detection of a laser beam spot shape.

In accordance with an aspect of the present invention, there is provided a laser beam spot shape detection method for detecting a spot shape of a laser beam oscillated by laser beam oscillation means and collected by a condenser in a laser machining apparatus. The laser machining apparatus includes: a chuck table operable to hold a workpiece; and a laser beam irradiation unit operable to irradiate a workpiece held by the chuck table with a laser beam. The laser beam irradiation unit includes: laser beam oscillation means adapted to oscillate a laser beam; and a condenser adapted to collect the laser beam oscillated by the laser beam oscillation means and irradiate the laser beam onto the workpiece held by the chuck table. The laser beam spot shape detection method includes: a concave mirror holding step of holding a concave mirror having a spherical face forming a reflecting face with the chuck table; a beam splitting means positioning step of positioning beam splitting means at an acting position between the laser beam oscillation means and the condenser, the beam splitting means passing a laser beam from the laser beam oscillation means to the condenser and guiding reflected light, which is collected by the condenser and reflected by the reflecting face of the concave mirror held by the chuck table, into a reflected light detection path; a focal point positioning step of positioning a focal point of the condenser in a proximity including a center of the spherical face forming the reflecting face of the concave mirror held by the chuck table; a laser beam irradiation step of activating the laser beam oscillation means and irradiating a laser beam collected by the condenser onto the concave mirror held by the chuck table; and an imaging step of capturing, by imaging means, images of reflected light reflected by the reflecting face of the concave mirror held by the chuck table and guided into the detection path by the beam splitting means.

Preferably, the imaging step moves the chuck table holding the condenser and the concave mirror relatively in a direction of an optical path of a laser beam irradiated from the condenser and positions the focal point of the condenser at a plurality of positions in areas sandwiching the center of the spherical face forming the reflecting face of the concave mirror so as to capture a plurality of images.

The present invention makes it possible to accurately find a spot shape of a laser beam irradiated from the condenser on the basis of images of reflected light captured in the imaging step. This provides a laser machining apparatus which allows for machining in a desired manner by adjusting aberration of the laser beam oscillation means, the optical system, and the condenser if the spot shape imaged by the imaging means differs from a specified shape.

Further, the laser beam spot shape detection method according to the present invention detects a spot shape by imaging reflected light reflected by the reflecting face of the concave mirror held by a chuck table, thus allowing for reliable detection of a spot shape even when the condenser has a large NA such as 0.4 to 0.9.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
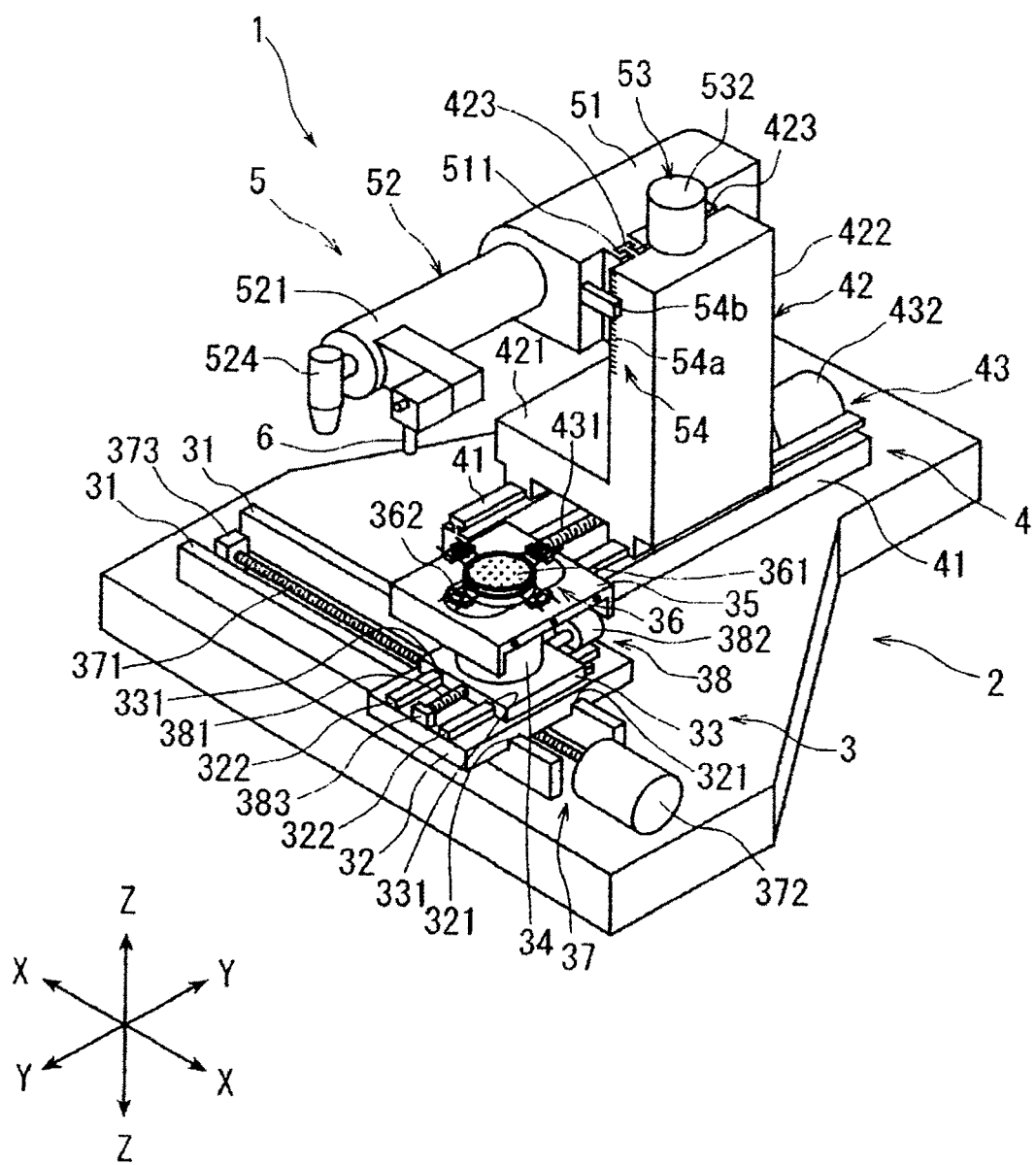
FIG. 1 is a perspective view of a laser machining apparatus which implements a laser beam spot shape detection method according to the present invention.

A detailed description will be given below of preferred embodiments of the present invention with reference to the accompanying drawings. FIG. 1 illustrates a perspective view of a laser machining apparatus 1 which implements a laser beam spot shape detection method according to the present invention. The laser machining apparatus 1 illustrated in FIG. 1 includes a stationary base 2, a chuck table mechanism 3, a laser beam irradiation unit support mechanism 4, and a laser beam irradiation unit 5. The chuck table mechanism 3 is arranged on the stationary base 2 in a manner movable in the X-axis direction shown by an arrow X and holds a workpiece. The laser beam irradiation unit support mechanism 4 is arranged on the stationary base 2 in a manner movable in the Y-axis direction shown by an arrow Y that is orthogonal to the X-axis direction. The laser beam irradiation unit 5 is arranged on the laser beam irradiation unit support mechanism 4 in a manner movable in the Z-axis direction shown by an arrow Z that is perpendicular to the X- and Y-axis directions.

The chuck table mechanism 3 includes a pair of guide rails 31, first and second sliding blocks 32 and 33, a support table 35, and a chuck table 36. The guide rails 31 are arranged on the stationary base 2 to be parallel to each other along the X-axis direction. The first sliding block 32 is arranged on the guide rails 31 in a manner movable in the X-axis direction. The second sliding block 33 is arranged on the first sliding block 32 in a manner movable in the Y-axis direction. The support table 35 is supported on the second sliding block 33 by a cylindrical member 34. The chuck table 36 serves as means to hold a workpiece. The chuck table 36 includes a suction chuck 361 that is formed with a porous material. An object to be measured is held on a holding face, a top face, of the suction chuck 361 by unshown sucking means. The chuck table 36 configured as described above is rotated by an unshown pulse motor that is arranged inside the cylindrical member 34. It should be noted that a clamp 362 is arranged on the chuck table 36 to fasten an annular frame that supports the workpiece via a protective tape.

The first sliding block 32 has, on the bottom face, a pair of guided grooves 321 which fit over the pair of guide rails 31 and, on the top face, a pair of guide rails 322 that are formed parallel along the X-axis direction. The first sliding block 32 configured as described above can move in the X-axis direction along the pair of guide rails 31 as the guided grooves 321 fit over the pair of guide rails 31. The chuck table mechanism 3 includes X-axis direction movement means 37 adapted to move the first sliding block 32 in the X-axis direction along the pair of guide rails 31. The X-axis direction movement means 37 includes a male threaded rod 371 and a driving source such as a pulse motor 372. The male threaded rod 371 is arranged parallel to and between the pair of guide rails 31. The pulse motor 372 rotates and drives the male threaded rod 371. The male threaded rod 371 has its one end supported in a freely rotatable manner by a bearing block 373 that is fastened to the stationary base 2 and its other end coupled to the output shaft of the pulse motor 372 for power transmission. It should be noted that the male threaded rod 371 is screwed into a female threaded through hole formed in a female threaded block that is not shown. The female threaded block is provided to protrude on the bottom face of the center portion of the first sliding block 32. Therefore, as the male threaded rod 371 is rotated in normal and reverse directions by the pulse motor 372, the first sliding block 32 moves in the X-axis direction along the guide rails 31.

The second sliding block 33 has, on the bottom face, a pair of guided grooves 331 which fit over the pair of guide rails 322 provided on the top face of the first sliding block 32. As the guided grooves 331 fit over the pair of guide rails 322, the second sliding block 33 can move in the Y-axis direction. The chuck table mechanism 3 includes first Y-axis direction movement means 38 adapted to move the second sliding block 33 in the Y-axis direction along the pair of guide rails 322 provided on the first sliding block 32. The first Y-axis direction movement means 38 includes a male threaded rod 381 and a driving source such as a pulse motor 382. The male threaded rod 381 is arranged parallel to and between the pair of guide rails 322. The pulse motor 382 rotates and drives the male threaded rod 381. The male threaded rod 381 has its one end supported in a freely rotatable manner by a bearing block 383 that is fastened to the top face of the first sliding block 32 and its other end coupled to the output shaft of the pulse motor 382 for power transmission. It should be noted that the male threaded rod 381 is screwed into a female threaded through hole formed in a female threaded block that is not shown. The female threaded block is provided to protrude on the bottom face of the center portion of the second sliding block 33. Therefore, as the male threaded rod 381 is rotated in normal and reverse directions by the pulse motor 382, the second sliding block 33 moves in the Y-axis direction along the guide rails 322.

The laser beam irradiation unit support mechanism 4 includes a pair of guide rails 41 and a movable support base 42. The guide rails 41 are arranged on the stationary base 2 to be parallel to each other along the Y-axis direction. The movable support base 42 is arranged on the guide rails 41 in a manner movable in the Y-axis direction. The movable support base 42 includes a travel support section 421 and a fitted section 422. The travel support section 421 is arranged on the guide rails 41 in a manner capable of traveling. The fitted section 422 is attached to the travel support section 421. The fitted section 422 has, on a side face, a pair of guide rails 423 that extend in the Z-axis direction. The laser beam irradiation unit support mechanism 4 includes second Y-axis direction movement means 43 adapted to move the movable support base 42 in the Y-axis direction along the pair of guide rails 41. The second Y-axis direction movement means 43 includes a male threaded rod 431 and a driving source such as a pulse motor 432. The male threaded rod 431 is arranged parallel to and between the pair of guide rails 41. The pulse motor 432 rotates and drives the male threaded rod 431. The male threaded rod 431 has its one end supported in a freely rotatable manner by an unshown bearing block that is fastened to the stationary base 2 and its other end coupled to the output shaft of the pulse motor 432 for power transmission. It should be noted that the male threaded rod 431 is screwed into a female threaded through hole formed in a female threaded block that is not shown. The female threaded block is provided to protrude on the bottom face of the center portion of the travel support section 421 making up the movable support base 42. Therefore, as the male threaded rod 431 is rotated in normal and reverse directions by the pulse motor 432, the movable support base 42 moves in the Y-axis direction along the guide rails 41.

The laser beam irradiation unit 5 includes a unit holder 51 and laser beam irradiation means 52. The laser beam irradiation means 52 is attached to the unit holder 51. The unit holder 51 has a pair of guided grooves 511 which fit, in a slidable manner, over the pair of guide rails 423 provided on the fitted section 422. As the guided grooves 511 fit over the pair of guide rails 423, the unit holder 51 is supported in a manner movable in the Z-axis direction.

Figure 2:
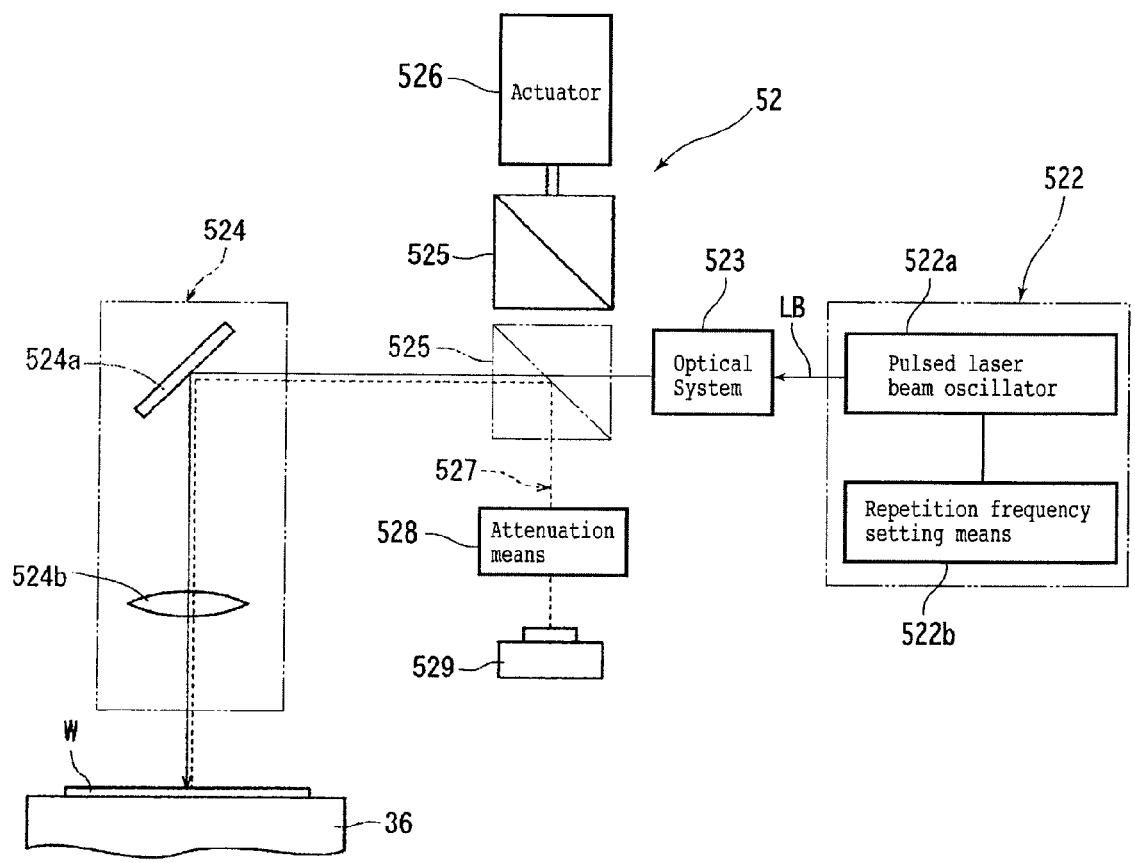
FIG. 2 is a block configuration diagram of laser beam irradiation means incorporated in the laser machining apparatus shown in FIG. 1.

The laser beam irradiation means 52 includes a cylindrical casing 521 that is fastened to the unit holder 51 and extends substantially horizontally. The casing 521 incorporates laser beam oscillation means 522 and an optical system 523 as illustrated in FIG. 2. The optical system 523 transfers a laser beam oscillated by the laser beam oscillation means 522. The laser beam oscillation means 522 includes a pulsed laser beam oscillator 522a and repetition frequency setting means 522b. The pulsed laser beam oscillator 522a includes a YAG laser oscillator. The repetition frequency setting means 522b is an attachment of the pulsed laser beam oscillator 522a. The laser beam oscillation means 522 oscillates a pulsed laser beam LB at a repetition frequency set by the repetition frequency setting means 522b. Further, the laser beam irradiation means 52 includes a condenser 524. The condenser 524 collects the pulsed laser beam LB oscillated by the laser beam oscillation means 522 and transferred by the optical system 523 and irradiates the pulsed laser beam LB onto the workpiece held by the chuck table 36. The condenser 524 includes a direction change mirror 524a and a condenser lens 524b. The direction change mirror 524a changes the direction of the pulsed laser beam LB oscillated by the laser beam oscillation means 522 and transferred by the optical system 523 to direct the pulsed laser beam LB toward the holding face of the chuck table 36. The condenser lens 524b includes a combination lens made up of a plurality of convex and concave lenses adapted to collect the pulsed laser beam LB whose direction has been changed by the direction change mirror 524a and irradiate the pulsed laser beam LB onto a workpiece W held by the chuck table 36. The condenser 524 configured as described above is fitted to the tip of the casing 521 as illustrated in FIG. 1.

Continuing with the description with reference to FIG. 2, the laser beam irradiation means 52 includes a beam splitter 525 serving as splitting means. The beam splitter 525 is arranged between the optical system 523 adapted to transfer the laser beam LB oscillated by the laser beam oscillation means 522 and the condenser 524. The beam splitter 525 can move back and forth between two positions, a retracted position shown by a solid line and an acting position shown by a long dashed double-short dashed line illustrated in FIG. 2. The beam splitter 525 is positioned at the retracted position shown by a solid line and the acting position shown by a long dashed double-short dashed line as appropriate by an actuator 526. When positioned at the acting position shown by a long dashed double-short dashed line illustrated in FIG. 2, the beam splitter 525 configured as described above passes the pulsed laser beam LB oscillated by the laser beam oscillation means 522 and transferred by the optical system 523 and guides reflected light collected by the condenser 524 and reflected by the reflecting face of a concave mirror held by the chuck table 36 into a reflected light detection path 527. The concave mirror will be described later. Attenuation means 528 and imaging means 529 are provided in the reflected light detection path 527. The attenuation means 528 attenuates the output of reflected light guided into the reflected light detection path 527 by the beam splitter 525. The imaging means 529 includes a profile camera adapted to capture reflected light attenuated by the attenuation means 528.

Referring back to FIG. 1, alignment means 6 is arranged on the front end portion of the casing 521 making up the laser beam irradiation means 52. The alignment means 6 detects an area to be machined with the laser beam irradiated from the condenser 524. The alignment means 6 includes, for example, illumination means, an optical system, and an imaging element (CCD). The illumination means illuminates a workpiece. The optical system captures an area illuminated by the illumination means. The imaging element produces an image from the image captured by the optical system. The alignment means 6 transmits captured image data to control means which will be described later.

Continuing with the description with reference to FIG. 1, the laser beam irradiation unit 5 includes Z-axis direction movement means 53 adapted to move the unit holder 51 in the Z-axis direction along the pair of guide rails 423. The Z-axis direction movement means 53 includes a male threaded rod (not shown) arranged between the pair of guide rails 423 and a driving source such as a pulse motor 532, as do the X-axis direction movement means 37, the first Y-axis direction movement means 38, and the second Y-axis direction movement means 43. The pulse motor 532 rotates and drives the male threaded rod. As the unshown male threaded rod is rotated in normal and reverse directions by the pulse motor 532, the unit holder 51 and the laser beam irradiation means 52 move in the Z-axis direction along the guide rails 423.

The laser beam irradiation unit 5 includes Z-axis direction position detection means 54 adapted to detect the position of the laser beam irradiation means 52 in the Z-axis direction. The Z-axis direction position detection means 54 includes a linear scale 54a and a read head 54b. The linear scale 54a is arranged parallel to the guide rails 423. The read head 54b is attached to the unit holder 51 and moves along the linear scale 54a together with the unit holder 51. The read head 54b of the Z-axis direction position detection means 54 transmits a pulse signal of one pulse to the control means which will be described later every 0.1 µm in the embodiment shown in FIG. 1.

Figure 3:
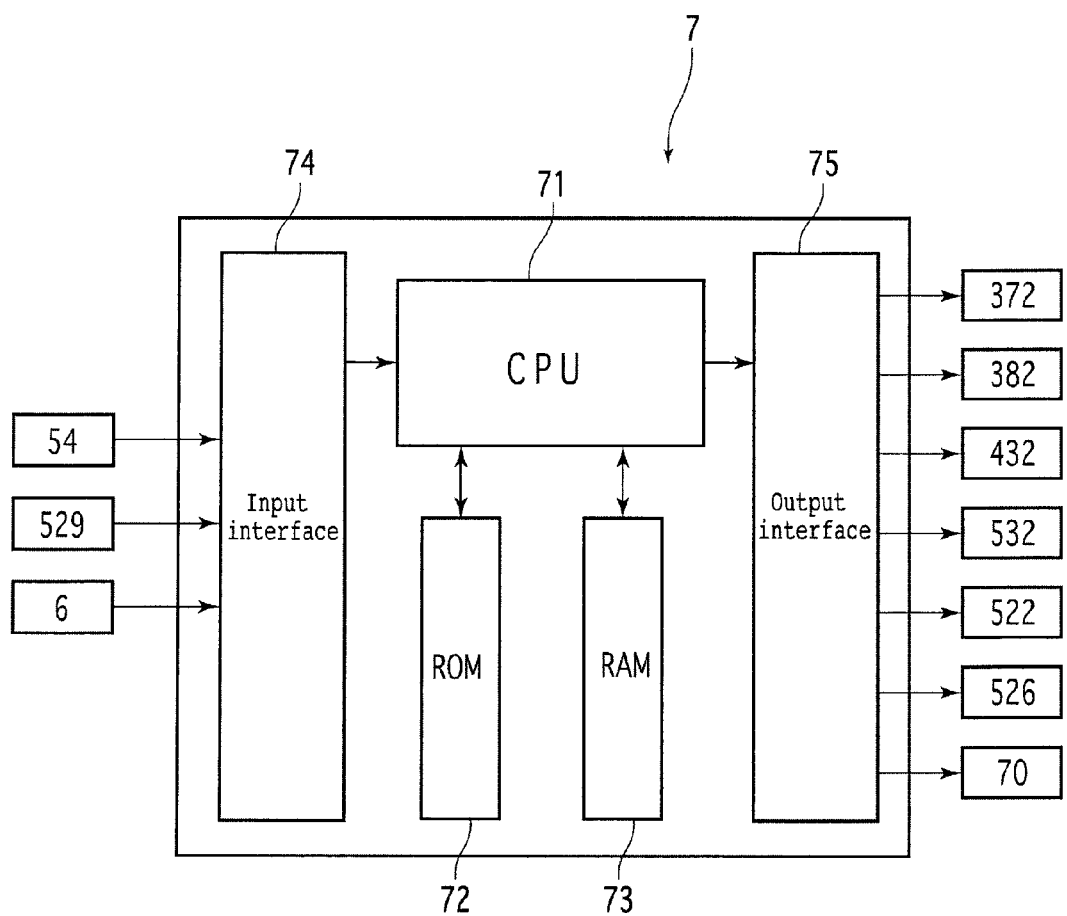
FIG. 3 is a block configuration diagram of control means incorporated in the laser machining apparatus shown in FIG. 1.

The laser machining apparatus 1 includes control means 7 illustrated in FIG. 3. The control means 7 includes a computer which includes, in turn, a central processing unit (CPU) 71, a read-only memory (ROM) 72, a random access memory (RAM) 73, an input interface 74, and an output interface 75. The CPU 71 performs arithmetic operations according to a control program. The ROM 72 stores the control program and so on. The RAM 73 is a readable and writable memory adapted to store arithmetic operation results and other information. The input interface 74 of the control means 7 is supplied with detection signals from the Z-axis direction position detection means 54, the imaging means 529, the alignment means 6, and so on. The output interface 75 of the control means 7 outputs control signals to the pulse motor 372, 382, 432, and 532, the laser beam oscillation means 522, the actuator 526, display means 70, and so on.

The laser machining apparatus 1 is configured as described above, and a description will be given below of the action thereof. In order to detect the spot shape of a laser beam irradiated from the condenser 524 of the laser beam irradiation means 52 of the laser machining apparatus 1 described above, a concave mirror 8 shown in FIGS. 4A and 4B is prepared. The concave mirror 8 includes a support section 81 and a reflecting face 82. The support section 81 is of the same size as the holding face of the chuck table 36. The reflecting face 82 is made up of a spherical face provided at the center of the support section 81. It should be noted that the reflecting face 82 made up of a spherical face has a center 82a of the spherical face.

Figure 4A:
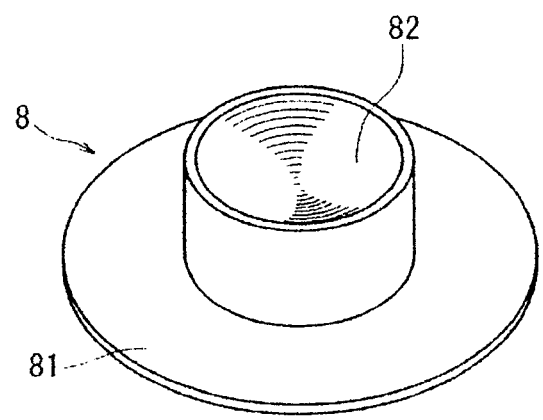
FIG. 4A is a perspective view of a concave mirror prepared for implementing the laser beam spot shape detection method according to the present invention.
Figure 4B:
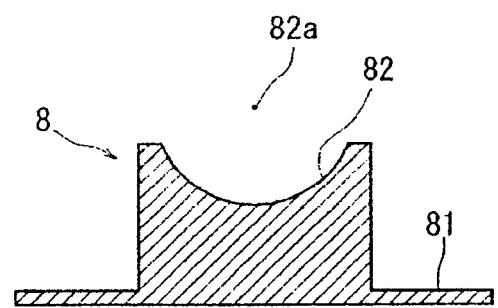
FIG. 4B is a sectional view of the concave mirror.
Figure 5:
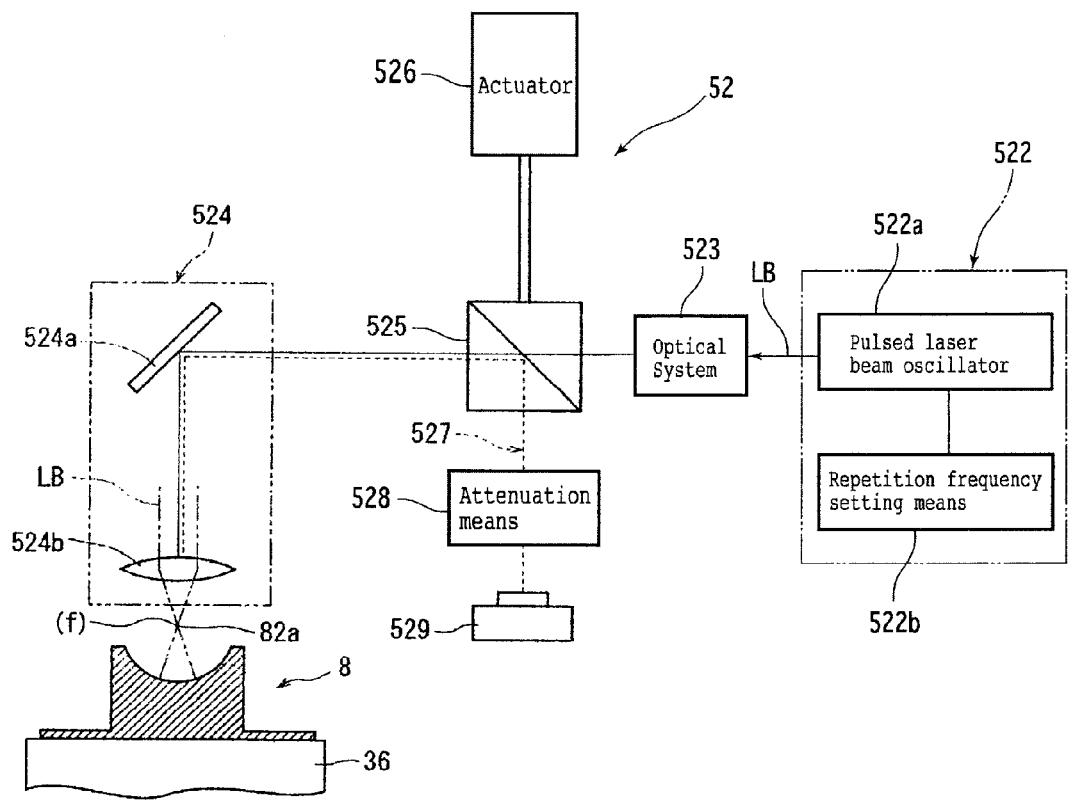
FIG. 5 is an explanatory diagram of the laser beam spot shape detection method implemented by using the laser machining apparatus shown in FIG. 1.

In order to detect a spot shape of a laser beam irradiated from the condenser 524 of the laser beam irradiation means 52, the concave mirror 8 shown in FIGS. 4A and 4B is placed on the chuck table 36 serving as chuck table as illustrated in FIG. 5. Then, unshown suction means is activated, thus sucking and holding the concave mirror 8 on the chuck table 36 (concave mirror holding step).

Further, the actuator 526 adapted to move the beam splitter 525 serving as the splitting means back and forth is activated, thus performing a splitting means positioning step adapted to position the beam splitter 525 at an acting position as illustrated in FIG. 5. As a result, the beam splitter 525 is positioned between the optical system 523 adapted to transfer a laser beam oscillated by the laser beam oscillation means 522 and the condenser 524.

Next, the Z-axis direction movement means 53 is activated, thus performing a focal point positioning step adapted to position a focal point (f) of the condenser 524 in a proximity including the center 82a of the spherical face forming the reflecting face 82 of the concave mirror 8 held by the chuck table 36 as illustrated in FIG. 5.

When the concave mirror holding step, the splitting means positioning step, and the focal point positioning step are complete as described above, the laser beam oscillation means 522 is activated, and the pulsed laser beam LB oscillated by the laser beam oscillation means 522 is transmitted via the optical system 523, collected by the condenser 524, and irradiated onto the reflecting face 82 of the concave mirror 8 held by the chuck table 36 (laser beam irradiation step). Thus, the pulsed laser beam LB irradiated onto the reflecting face 82 of the concave mirror 8 is reflected by the reflecting face 82. Reflected light thereof travels backward through the condenser lens 524b and the direction change mirror 524a making up the condenser 524 and is guided into the beam splitter 525 as shown by a dashed line in FIG. 5. Reflected light of the pulsed laser beam LB guided into the beam splitter 525 as described above is split into the reflected light detection path 527 and attenuated to a given output by the attenuation means 528 arranged in the reflected light detection path 527. Reflected light of the pulsed laser beam LB attenuated to a given output by the attenuation means 528 is imaged by the imaging means 529 that includes a profile camera, and an image signal is transmitted to the control means 7 (imaging step).

Figure 6:
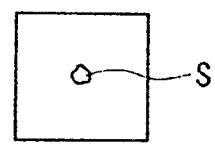
FIG. 6 is an explanatory diagram of a laser beam spot shape detected by the laser beam spot shape detection method shown in FIG. 5.

Thus, the control means 7 can directly find an outline of a spot S of the reflected light as illustrated in FIG. 6 on the basis of the image signal of the reflected light of the pulsed laser beam LB transmitted from the imaging means 529. The control means 7 not only stores the outline of the spot S of the reflected light in the RAM 73 but also displays the outline on the display means 70. It is possible to verify the spot shape of the pulsed laser beam LB irradiated from the condenser 524 on the basis of the outline of the spot S displayed on the display means 70. This provides a laser machining apparatus which allows for machining in a desired manner by adjusting aberration of the laser beam oscillation means 522, the optical system 523, and the condenser 524 if the spot shape imaged by the imaging means 529 differs from a specified shape. Further, the laser beam spot shape detection method described above detects a spot shape by imaging reflected light reflected by the reflecting face 82 of the concave mirror 8 held by the chuck table 36, thus allowing for reliable detection of a spot shape even when the condenser 524 has a large NA such as 0.4 to 0.9.

A description will be given next of another embodiment of the imaging step. The another embodiment of the imaging step moves the chuck table 36 holding the condenser 524 and the concave mirror 8 relatively in the direction of the optical path of the pulsed laser beam LB irradiated from the condenser 524 and positions the focal point of the condenser 524 at a plurality of positions in areas sandwiching the center 82a of the spherical face forming the reflecting face 82 of the concave mirror 8, thus acquiring a plurality of images.

That is, the another embodiment of the imaging step activates the Z-axis direction movement means 53, moves the condenser 524 of the laser beam irradiation means 52 in the Z-axis direction, and positions the condenser 524 at a first detection position (Z1) where the focal point (f) of the condenser 524 is higher as a design value than the center 82a of the spherical face forming the reflecting face 82 of the concave mirror 8 held by the chuck table 36 by a given value (e.g., 20 µm) while at the same time performing the laser beam irradiation step described above. When the Z-axis direction movement means 53 is activated to position the condenser 524 at the first detection position (Z1) in this manner, the position of the condenser 524 is adjusted on the basis of a Z-axis direction position signal supplied from the Z-axis direction position detection means 54. Then, the imaging means 529 that includes a profile camera as described above is activated, thus imaging reflected light of the pulsed laser beam LB at the first detection position (Z1) and transmitting an image signal to the control means 7. On the basis of the image signal of reflected light of the pulsed laser beam LB transmitted from the imaging means 529 as described above, the control means 7 finds an outline of the spot S of the reflected light at the first detection position (Z1) as illustrated in FIG. 7, storing the outline in the RAM 73 and displaying the outline on the display means 70.

From here onwards, the Z-axis direction movement means 53 is activated, thus moving the condenser 524 of the laser beam irradiation means 52 in the Z-axis direction and positioning the condenser 524 at four different positions. Then, the imaging means 529 that includes a profile camera is activated as described above, thus imaging reflected light of the pulsed laser beam LB at the four different positions and transmitting the image signal to the control means 7. The four positions are a second detection position (Z2) where the focal point (f) of the condenser 524 is higher as a design value than the center 82a of the spherical face forming the reflecting face 82 of the concave mirror 8 held by the chuck table 36 by a given value (e.g., 10 μm), a third detection position (Z3) where the focal point (f) of the condenser 524 coincides with the center 82a of the spherical face forming the reflecting face 82 of the concave mirror 8, a fourth detection position (Z4) where the focal point (f) of the condenser 524 is lower as a design value than the center 82a of the spherical face forming the reflecting face 82 of the concave mirror 8 held by the chuck table 36 by a given value (e.g., 10 μm), and a fifth detection position (Z5) where the focal point (f) of the condenser 524 is lower as a design value than the center 82a of the spherical face forming the reflecting face 82 of the concave mirror 8 held by the chuck table 36 by a given value (e.g., 20 μm). Thus, on the basis of the image signal of reflected light of the pulsed laser beam LB transmitted from the imaging means 529, the outline of the spot S of reflected light is found by the control means 7 at each of the second, third, fourth, and fifth detection positions (Z2), (Z3), (Z4), and (Z5) as illustrated in FIG. 7, thus storing the outlines in the RAM 73 and displaying the outlines on the display means 70.

Figure 7:
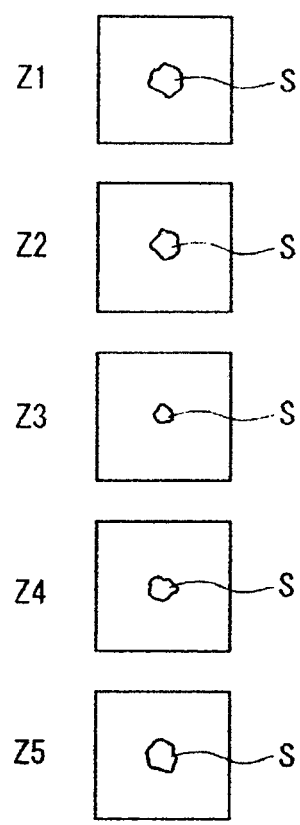
FIG. 7 is an explanatory diagram of laser beam spot shapes detected by another embodiment of the laser beam spot shape detection method according to the present invention.

By displaying the outline of the spot S of reflected light at each of the first, second, third, fourth, and fifth detection positions (Z1), (Z2), (Z3), (Z4), and (Z5) on the display means 70 as illustrated in FIG. 7, it is possible to verify the spot shape of the pulsed laser beam LB irradiated from the condenser 524. It should be noted that, in FIG. 7, the spot S at the third detection position (Z3) is the smallest of all in size (area). Therefore, the spot S at the third detection position (Z3) is a condensing spot, and it is possible to find the shape and size (area) of the condensing spot. Further, it is possible to recognize the spot shapes previous and next to the condensing spot. It should be noted that if the spot shape imaged by the imaging means 529 differs from a specified shape as described above, the machining quality will be adversely affected. Therefore, the condenser is replaced, or the optical system such as the combination lens is corrected.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser beam spot shape detection method for detecting a spot shape of a laser beam oscillated by laser beam oscillation means and collected by a condenser in a laser machining apparatus, the laser machining apparatus including:
   a chuck table operable to hold a workpiece; and
   a laser beam irradiation unit operable to irradiate a workpiece held by the chuck table with a laser beam, the laser beam irradiation unit having laser beam oscillation means adapted to oscillate a laser beam, and a condenser adapted to collect the laser beam oscillated by the laser beam oscillation means and irradiate the laser beam onto the workpiece held by the chuck table,
   the laser beam spot shape detection method comprising:
   a concave mirror holding step of holding a concave mirror having a spherical face forming a reflecting face with the chuck table;
   a beam splitting means positioning step of positioning beam splitting means at an acting position between the laser beam oscillation means and the condenser, the beam splitting means passing a laser beam from the laser beam oscillation means to the condenser and guiding reflected light, which is collected by the condenser and reflected by the reflecting face of the concave mirror held by the chuck table, into a reflected light detection path;
   a focal point positioning step of positioning a focal point of the condenser in a proximity including a center of the spherical face forming the reflecting face of the concave mirror held by the chuck table;
   a laser beam irradiation step of activating the laser beam oscillation means and irradiating a laser beam collected by the condenser onto the concave mirror held by the chuck table; and
   an imaging step of capturing, by imaging means, images of reflected light reflected by the reflecting face of the concave mirror held by the chuck table and guided into the detection path by the beam splitting means.

2. The laser beam spot shape detection method of claim 1, wherein
   the imaging step moves the chuck table holding the condenser and the concave mirror relatively in a direction of an optical path of a laser beam irradiated from the condenser and positions the focal point of the condenser at a plurality of positions in areas sandwiching the center of the spherical face forming the reflecting face of the concave mirror so as to capture a plurality of images.

* * * * *